Figure 1:
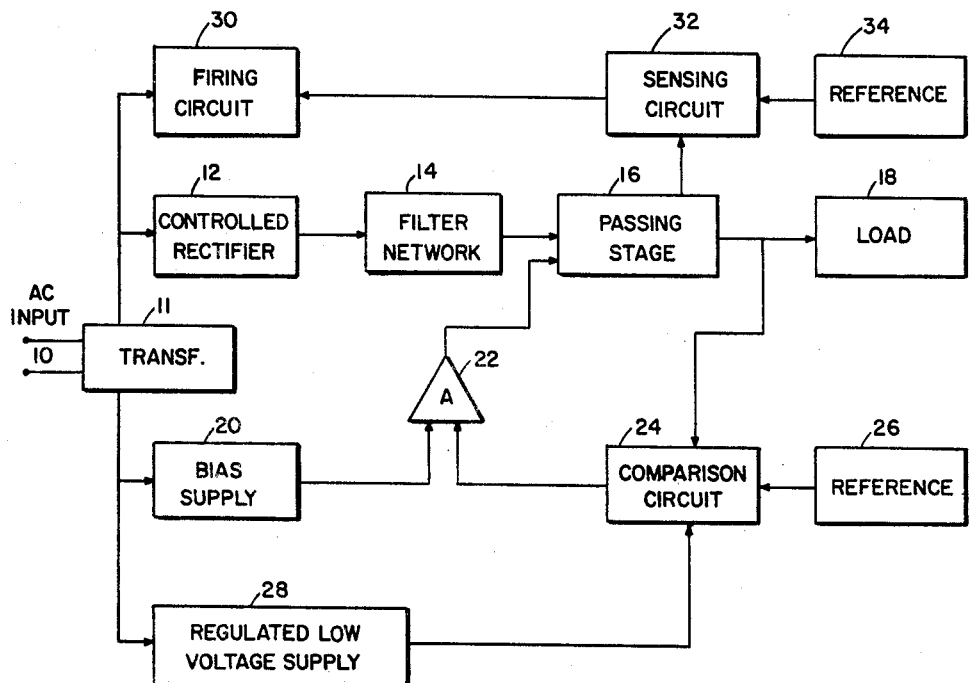

May 4, 1965     R. LOUCKS     3,182,247

POWER SUPPLY SENSING MEANS

Filed June 2, 1961

INVENTOR.
RUSSELL LOUCKS

AGENTS

United States Patent Office 3,182,247
Patented May 4, 1965

3,182,247
POWER SUPPLY SENSING MEANS
Russell Loucks, Ridgefield, Conn., assignor, by mesne assignments, to Raytheon Company, Lexington, Mass., a corporation of Delaware
Filed June 2, 1961, Ser. No. 114,351
6 Claims. (Cl. 323—22)

This invention relates to regulated power supplies and more particularly to a novel pre-regulator voltage sensing system for a transistorized power supply.

Many of the prior art regulated transistorized power supplies utilize wide range main regulated stage or stages usually preceeded by a Controlled Rectifier pre-regulator stage which latter stage maintains a reduced power dissipation in the passing transistor(s) of the main regulating stage. The pre-regulator stage may also utilize a Unijunction transistor firing circuit to supply firing pulses to the Controlled Rectifiers.

Both the main regulator and the pre-regulator stages must therefore, require sensing means to be associated therewith to insure than the regulator stages will only vary within certain prescribed limits.

If the output voltage is designed to be varied over a considerable range, the pre-regulator output voltage must therefore change in accordance with changes in the output voltage in order to maintain low power dissipation in the transistor passing stage. The output voltage is varied by changing the parameters of the main sensing circuit. In order that the pre-regulator output voltage vary in accordance with the output voltage, the parameters of its sensing circuit must be made to change similarly.

This, then, requires that the main sensing and the pre-regulator sensing circuits be ganged so that both change similarly in sense and magnitude. This type of system has certain inherent disadvantages which preclude, for example, output voltage adjustment from a remote point.

When trying to avoid the difficulties of the previously discussed type of regulating system, that is, by sensing the passing stage voltage, one is then faced with the difficulty that the ripple voltage out of the pre-regulator is relatively high (of the order of 4–5%) while a ripple of only about 0.01% is normally required at the output. A high pre-regulator ripple results in a high ripple across the passing transistor stage (50–75%), which will prevent the firing circuit from operating properly and also makes it extremely difficult for the sensing circuit to accurately detect changes in the D.C. level due to the presence of the high A.C. ripple.

My novel sensing circuit is connected across a high ripple passing stage to compare a portion of the D.C. voltage appearing across the passing stage with a reference voltage and produce an error signal in response to D.C. voltage changes in the presence of a high A.C. ripple. This error signal is utilized to control and regulate the firing of a Unijunction, transistorized firing circuit.

It is, therefore, a principal object of my invention to provide a novel sensing means capable of detecting changes in the D.C. level of a passing stage in the presence of a high A.C. ripple.

It is still another object of the instant invention to provide a novel sensing means which does not require physical ganging to any other sensing means in the circuit.

Figure 2:
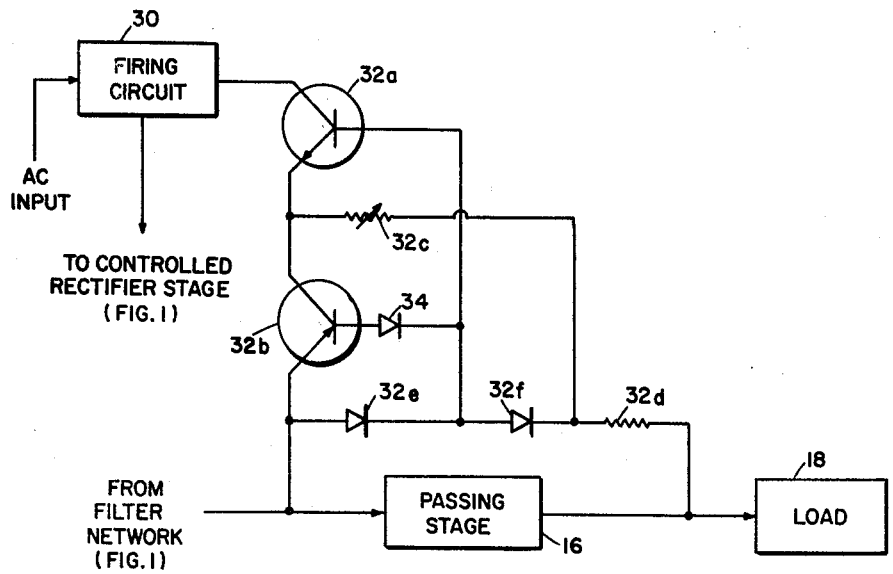

The features of my invention which I believe to be novel are set forth with particularity in the appended claims. My invention itself, however, both as to its organization and method of operation, together with further objects and advantages thereof may best be understood by referring to the following description taken in conjunction with the accompanying drawings in which:

FIG. 1 represents a block diagram of a typical regulated power supply utilizing my novel passing stage sensing circuit; and FIG. 2 represents a partial schematic and block diagram indicating the specific circuit embodying the features of my invention and its utility in the block diagram of FIG. 1.

Referring now to FIG. 1, the alternating current power input is shown generally at input terminals 10 which is usually applied to the primary winding of a transformer 11. The secondary windings of the transformer supply alternating current power to operate a firing circuit 30, Controlled Rectifiers 12, bias supply 20 and a regulated low voltage power supply 28. The Controlled Rectifiers 12 provide an output which is applied to the filter network 14 which in turn is applied to a passing stage 16 and subsequently made available to a load generally designated as 18. The output of the passing stage, furnished to the load 18 is also made available as an input to a comparison circuit 24, which in conjunction with a reference 26 detects changes in the output voltage furnished to the load 18 and provides an error signal which is amplified by amplifier 22 and applied to the passing stage transistor 16.

My novel sensing circuit 32 is indicated as detecting changes in voltage appearing across passing stage 16 and, with its associated reference 34, accurately detects changes in D.C. voltage in the presence of a high A.C. ripple. Any change in the voltage appearing across passing stage 16 is applied as an appropriate input signal to firing circuit 30 so that it may be accurately timed.

Referring now to FIG. 2, it will be seen that the two transistors 32a and 32b, the two resistors 32c and 32d and two diodes 32e and 32f comprise the sensing circuit, while diode 34 comprises the reference circuit of FIG. 1. In all other respects, firing circuit 30, passing stage 16 and load 18 are identical with similarly numbered elements of FIG. 1.

An operating potential is derived from the potential across passing stage 16. This operating potential is applied across the series string of diodes 32e, 32f and resistor 32d in the manner shown. The anode of diode 32e is also connected to the emitter element of transistor 32b. Reference diode 34 is connected between the base element of transistor 32b and the common connection between diodes 32e and 32f. The collector element of transistor 32b is connected to the emitter element of transistor 32a and base element of transistor 32a is connected to the common connection of diodes 34, 32e and 32f. The collector element of transistor 32a is connected as an input to firing circuit 30. To complete the circuit, variable resistor 32c is connected between the collector element of transistor 32b and the common connection between diode 32f and resistor 32d.

It will be seen, that when the voltage across passing stage 16 increases, the voltage appearing across diodes 32e, 32f and resistor 32d will also tend to increase since these three elements are in parallel with passing stage 16. The voltage change across the diodes 32e and 32f will be small compared with the change across resistor 32d, but nevertheless will be measurable. Since the series combination of transistor 32b and reference diode 34 is in parallel with diode 32e, any change in the voltage appearing across diode 32e will result in readjustment of the voltages appearing across transistor 32b and diode 34. As the voltage across diode 32e increases slightly, transistor 32b becomes rebiased to conduct more current through resistor 32c. This increase in current through resistor 32c rebiases transistor 32a to reduce the current flowing from the firing circuit 30 and increase the delay in the firing angle of the controlled rectifiers which in turn reduces the output voltage of the pre-regulator. The A.C. impedance of diodes 32e and 32f is substantially lower than the D.C. impedance of the diodes 32c and 32f and is even more substantially lower than the A.C. impedance of resistor 32d. Thus, the A.C. ripple which is present in passing stage 16 will appear almost entirely across resistor 32d while the D.C. component will be divided between diodes 32e, 32f and resistor 32d. Thus, the voltage across diode 32e will be essentially D.C. with very little A.C. component resulting in a relatively small A.C. component in the signal applied to the firing circuit 30.

While there has been described what is presently considered the preferred embodiment of my invention, it will be obvious to those skilled in the art that various other changes and modifications may be made therein without departing from the inventive concept, and it is aimed in the appended claims to cover all such changes and modifications as fall within the true spirit and scope of my invention.

What is claimed is:

1. A device for sensing changes in voltage comprising a network subject to direct voltage changes in the presence of an alternating voltage ripple component, a plurality of series connected impedance devices in parallel with the network, the alternating voltage component appearing substantially across one of the impedance devices including resistance means and the direct voltage change appearing substantially across the remaining impedance devices including diode means, means applying the changes in direct voltage appearing across the remaining impedance devices to a controlling means to correct for the changes of direct voltage in the network beyond a predetermined value.

2. A sensing device comprising a network subject to direct voltage changes therein in the presence of an alternating voltage ripple component, an asymmetrically conducting device having a relatively low resistance to current transmitted therethrough in a forward direction connected in series with an impedance device having a substantially higher alternating current impedance than said asymmetrically conducting device, the asymmetrically conducting device and the impedance device connected in parallel with the network whereby the alternating voltage ripple component appears substantially across the impedance device and the direct voltage changes appear across the asymmetrically conducting device, and means applying changes in the direct voltage as a correction voltage to a controlling means to correct for changes in the direct voltage level beyond a predetermined value.

3. The device of claim 2 wherein the asymmetrically conducting device comprises first and second diodes and the impedance device comprises a resistor both diodes and resistor being connected in series.

4. The device of claim 3 further comprises a first semiconductor amplifier and a third diode connected in series, said series combination connected across the first diode whereby direct voltage changes appearing across the first diode rebiases the first amplifier to conduct current in accordance with the changes in direct voltage.

5. The device of claim 4 further comprising a second semiconductor amplifier in parallel with the series connected third diode and first semiconductor amplifier whereby conduction of the first amplifier rebiases the second amplifier to regulate the operation of the controlling means in accordance with the changes in direct voltage.

6. A device for sensing changes in voltage comprising a network subject to direct voltage changes in the presence of an alternating voltage ripple component having an input and an output, a first semiconducting device having its anode connected to the input of the network, the cathode of the first semiconducting device connected to the anode of a second semiconducting device and a first resistor connected between the cathode of the second semiconducting device and the output of the network, a first transistor amplifier having its emitter element connected to the input of the network, a third semiconducting device having its anode connected to the base element of the first transistor amplifier and having its cathode connected to the common connection between the first and second semiconducting devices, a second transistor amplifier having its base element connected between the first and second semiconducting devices, the emitter element of the second transistor amplifier connected to the collector element of the first transistor amplifier and a second variable resistor connected between the emitter element of the second transistor amplifier and the common connection between the second diode and the first resistor, the collector element of the second transistor amplifier connected to a utilization circuit whereby the alternating voltage component of the network appears substantially across the first resistor and direct voltage changes appear across the first semiconducting device to rebias the first and second transistors in accordance with the changes in direct voltage to correct changes in the direct voltage level beyond a predetermined value.

References Cited by the Examiner
UNITED STATES PATENTS

| | | | |
|---|---|---|---|
| 2,563,740 | 8/51 | Parker | 321—10 X |
| 2,801,346 | 7/57 | Rongen et al. | 323—22 |
| 2,806,963 | 9/57 | Woll | 323—22 |
| 2,897,430 | 7/59 | Winkel | 323—22 |
| 2,965,833 | 12/60 | Jensen | 323—22 |
| 2,977,523 | 3/61 | Cockrell | 323—22 |

LLOYD McCOLLUM, *Primary Examiner.*

MILTON O. HIRSHFIELD, RALPH D. BLAKESLEE, *Examiners.*